UNITED STATES PATENT OFFICE.

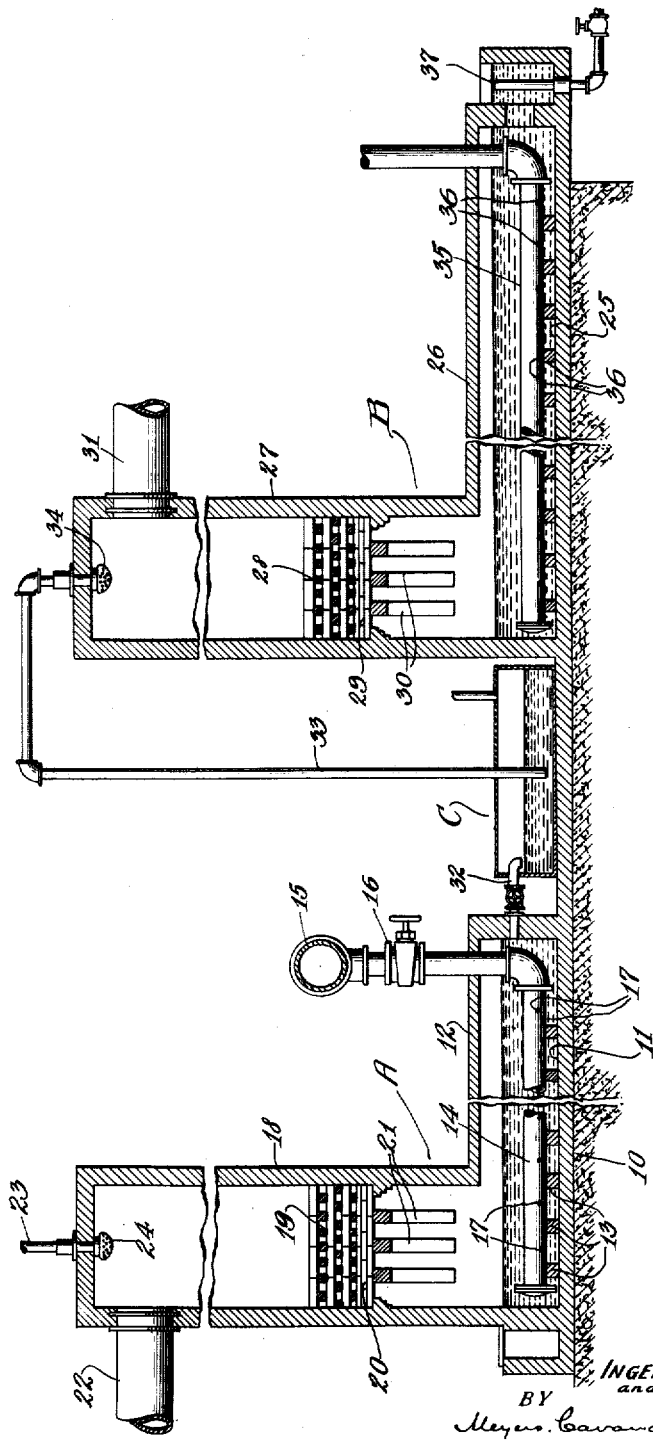

INGENUIN HECHENBLEIKNER AND THOMAS C. OLIVER, OF CHARLOTTE, NORTH CAROLINA, ASSIGNORS TO CHEMICAL CONSTRUCTION COMPANY, OF NEW YORK, N. Y., A CORPORATION OF NORTH CAROLINA.

METHOD OF TREATING ACIDS.

1,421,688.   Specification of Letters Patent.   Patented July 4, 1922.

Application filed June 16, 1921. Serial No. 477,936.

*To all whom it may concern:*

Be it known that we, INGENUIN HECHENBLEIKNER and THOMAS C. OLIVER, citizens of the United States, and both residents of Charlotte, in the county of Mecklenburg and State of North Carolina, have invented certain new and useful Improvements in Methods of Treating Acids, of which the following is a specification.

This invention relates to a method of treating acids and more particularly to a method for reclaiming sludge acids or separated sludge acids obtained in the refining of petroleum oils or their fractional distillates; and has special reference to a process for concentrating and purifying the sludge or petroleum acids to render the same suitable for further use.

As is well known, crude petroleum oil or its fractional distillates is refined by subjecting the same to the action of sulphuric acid so that the latter will absorb the heavy hydrocarbons and other undesirable elements present in the crude oil. In practice the sulphuric acid so used has an initial strength of about 66 degrees Baumé or stronger, as for example in the case of California acid which is started at an initial strength greater than 100%, but at the completion of the operation and after the refined oil has been separated there remains a sludge or waste acid which not only contains the impurities removed from the oil, but is also of a reduced strength, usually about 50 degrees Baumé, due to the fact that the acid has absorbed a certain amount of water or has given up some of the $SO_3$ contents during the refining process. This sludge acid is generally then subjected to further dilution with steam and water in the operation of recovering such oil as may remain therein, and for the purpose of relieving the acid as much as possible of its absorbed impurities. This secondary treatment results in further diluting the acid and reducing it to a strength of usually about 30 degrees Baumé, stronger acids such as California acids being reduced to a strength of about 50 degrees Baumé and there also remains in the body of acid a considerable amount of hydrocarbons containing volatile and other organic impurities. Therefore, in order to reclaim or recover or restore the sulphuric acid from the sludge acid or the separated sludge acid and render it fit for further use, it is not only necessary to concentrate the acid for the purpose of eliminating the water and thereby raising or restoring the acid to its efficient working strength of about 66 degrees Baumé, but it is further required that the undesirable hydrocarbons which are mainly in the form of tars, asphalts, paraffines or other unsaturated hydrocarbons be broken up, driven off, and otherwise eliminated.

It is a known fact that the acid can be readily concentrated to a strength of about 78 per cent $H_2SO_4$, this being equivalent to a strength of 60 degrees Baumé before any great loss of the acid in the form of fumes takes place. This has been taken advantage of in the concentration and purification of the acid by treating the acid in two stages, concentrating the acid in the first stage to a strength of 60 degrees Baumé and then concentrating the acid in a second stage to about 66 degrees Baumé. In bringing the acid up to 60 degrees Baumé there is generated or produced a maximum of steam with practically no acid fumes. In taking the acid from 60 degrees Baumé to 66 degrees Baumé there is produced much less steam and a relatively large amount of acid fumes. In the first step or stage the waste steam and other gases are permitted to exit directly into the atmosphere, the non-existence of acid fumes rendering unnecessary any expensive scrubbing towers for washing the gases to reclaim the fumes and to prevent the same from flowing out into the surrounding territory. The next step or second stage is carried on in such manner that the gases containing the acid fumes are passed through scrubbing towers or other apparatus such as the Cottrell precipitators which may be of simple construction since no large amount of steam need be treated in such towers, the acid fumes being washed and reclaimed and such fumes, destructive to vegetation, being prevented from having exit into the surrounding atmosphere.

For restoring or concentrating the sludge acids in its two stages it is customary to subject the same to heat to effect evaporation or to drive off the excess water present. This application of heat is done in many ways, such as by the use of open lead pans followed with cast iron or other types of closed stills. A recent process of subjecting the acid to heat, such process being described, for example, in the patent to Thomas C. Oliver, No. 1,195,075, dated August 15, 1916 and Ingenuin Hechenbleikner, No. 1,264,182, dated April 30, 1918, includes primarily internally heating the acid by the blowing under pressure of heated air through a bath of the acid. The heating of the acid functions not only to effect a concentration of the same but the heating is carried on in such manner as to eliminate the organic impurities in the acid to effect the purification of the same. Our present invention comprehends a method of obtaining the concentrated and purified acid in an improved manner.

We have found that in heating the sludge acid and more specifically in internally heating the acid by the blowing of heated air under pressure through a bath of the acid, that it is undesirable to divide the concentration of the acids in the two stages hereinbefore mentioned and heretofore used. In heating the acid it is found that at a certain strength thereof the hydrocarbons therein char and coke so that they cannot be broken up and driven off. This charring or coking point of the acid varies in different sludge acids according to the type of crude oils being refined and also according to the method used in refining them. Such charring or coking point may be as low as 47 degrees Baumé and as high as 57 degrees Baumé. In any given type of sludge acid, however, the coking or charring point of the acid, that is, the acid strength at which the charring or coking of the hydrocarbons takes place, is a determinable and therefore a definite quantity. We have found that in heating the sludge acids in the first stage above this charring or coking point, which in substantially all cases will be above 57 degrees Baumé, that the weak acid trickles into a boiling bath of the strong acid and the hydrocarbons char and coke, forming relatively large lumps which are not driven off and eliminated during the heating treatments and which remain in the resultant acid, preventing that purification which is desired to be attained. In some cases heating the acid above the charring point is accompanied by foaming. We have further found that if the acid is heated in the first stage while keeping the same below that strength at which charring or coking begins, which is substantially always below 57 degrees Baumé, that the hydrocarbons are volatilized, oxidized, driven off and otherwise eliminated and that charring or coking will not take place when the acid is subsequently heated and concentrated to a greater strength, with the result that the finished acid obtained shows a minimum of contamination. Where heating the acid is accompanied by foaming, the foaming point of the acid may be taken as a convenient test point or guide in keeping the acid below the charring point. The foaming point of the acid also varies from about 48 degrees Baumé to 63 degrees Baumé, according to the type of crude oils being refined and the method used in their refinement. Where the acid foams and the foaming point is taken as a test point, it may be illustrated that if an acid which while being concentrated foams from a range of 55 to 58 degrees Baumé and such acid is maintained in the first heating or concentrating stage at a strength approximating 53 degrees Baumé, the undesirable charring and coking is done away with and a large part of the organic impurities is eliminated. After the now partially concentrated and purified acid is subjected to further heat at its second stage to complete the concentration thereof, it is found that the organic impurities have been substantially all eliminated, the acid being free from any charred or coked lumps of hydrocarbon impurities.

To the accomplishment of the foregoing in concentrating and purifying the sludge acid and to the attaining of such other objects as may hereinafter appear, our invention consists in the elements and their relation one to the other and in the processes and steps as hereinafter particularly described and sought to be defined in the claims, reference being had to the accompanying drawing which shows, merely for purposes of illustration, a type of apparatus which may be used in the carrying on of the process and in which:

The figure is a cross sectional view of apparatus used in the practicing of our invention.

Before entering into a detailed description of our invention, we will briefly outline the steps of the process used and the apparatus we prefer to utilize in practicing the steps of the process. The weak sludge acid obtained in the refining of petroleum oils is first subjected to internal heat treatment, it being preferred to heat the acid by passing hot air or gases under pressure through a body of the acid, the acid being agitated and heated by the gases passing therethrough with the acid maintained below the boiling point thereof. The heated air or gases bubbling through the sludge acid absorbs and carries off water therefrom, the organic impurities in the acid being broken up, oxidized, carried off and otherwise eliminated by the hot gases, the gases in this manner causing a concentration and purification of the petroleum sludge. The heat in this first step or stage is carried on below the charring or coking point of the acid, the concentration effected being of a strength below that strength at which the hydrocarbons in the sludge acid begins to char or coke. This charring or coking point is a variable quantity depending upon the type of refined oils from which the sludge is obtained and depending also upon the method of refining used, the charring or coking point of any acid, however, being a determinable and therefore a known quantity. By heating the sludge acid to effect its concentration while keeping the same below its charring point it is found that considerable of the organic impurities in the acid may be broken up and driven off with the spent gases in the first operating stage and that coking or charring of the hydrocarbons is as a consequence prevented. The acid after being thus treated in its first step is then subjected to a further heat treatment for the purpose of further concentrating the same to bring the acid up to the desired strength which is usually about 66 degrees Baumé. This subsequent heating comprises the second stage of heat treatment, the acid in this second stage being heated in any desired manner, it being preferred, however, to also heat the acid internally in this second stage, hot air or gases being preferably passed or forced through a body of the now partially concentrated acid for effecting the further concentration thereof, this second heat treatment also effecting completion of the purification of the acid. The heating and concentrating steps may be practiced with any appropriate apparatus. The apparatus we prefer to use comprises briefly a plurality of heating chambers each forming an elongated trough for holding a body of the acid, each chamber being provided with a pipe section formed with suitable air ports in the form of perforations, the pipe section being adapted for conducting heated gases under pressure from a suitable source, the heated gases being forced under pressure through the ports and through the body of acid in the chamber for agitating and heating the same. Each of the heating or concentrating chambers is preferably provided with a packed absorption tower used principally for preheating purposes to drive off volatile impurities and to effect fuel economy. The weak sludge acid is admitted in the form of a spray in the first tower, the acid trickling down the tower and running countercurrent to the hot spent gases and steam issuing from the first heating chamber, the weak acid being concentrated in the first heating chamber to a strength below the charring or coking point thereof, as hereinabove indicated. After the desired strength is obtained the now partially concentrated acid is conducted to the top of the second tower and the acid is admitted to the second tower also preferably in the form of a spray, this acid being further heated by running countercurrent to the spent gases and fumes moving up from the second heating chamber and through the second tower. The acid collecting in the second heating or concentrating chamber is then heated to effect further concentration and purification of the same, as hereinbefore referred to, a reclaimed and recovered acid being thus obtained.

Referring now more in detail to the drawings, we provide two concentrating chambers A and B respectively, the concentrating chamber A being intended for heating and concentrating the weak sludge acid up to a strength below the charring or coking point of the acid, the heating and concentrating chamber B being intended for effecting further concentration of the acid above the said charring point. The chambers are substantially similar in structure, both being supported by a suitable foundation which may, for example, be a cement foundation 10, the chamber A, preferably in the form of an elongated trough-like flue which is preferably about 25 feet in length, having a bottom 11 constructed of suitable acid resisting brick, the trough section being provided with an arched roof 12 also preferably constructed of an acid resisting brick. Supported longitudinally on the bottom of the trough, as by means of blocks 13, also preferably made of acid resisting material, are one or more pipe sections 14, one being shown in the drawings, the pipe section 14 being also made of a suitable acid resisting material and adapted for conducting heated air or gases from a suitable source such as a furnace (not shown) the pipe section 14 being connected to a main conduit 15 which is in turn connected to the furnace, a valve 16 being interposed in the line of connection between the conduit 15 and the pipe 14 for controlling the flow of the heated gases into the pipe section 14. The conducting pipe 14 is provided with a plurality of perforations 17 spaced along the pipe, the perforations functioning as ports for admitting the heated air or gases into the concentrating chamber. Communicating with the trough-like heating or concentrating chamber is a tower 18 constructed of suitable acid resisting brick, this tower being intended for preheating purposes to effect fuel economy and to drive off the more volatile hydrocarbons in the sludge acid. The tower 18 is preferably provided with a brick checkerwork 19 supported by bridge 20 formed of parallel rows of bricks, the bridge being in turn supported by a series of spaced arches 21.

Communicating with the absorption tower 18 at a region near the roof thereof is an outlet pipe section 22, the said pipe section functioning as an outlet flue for the spent gases and steam issuing from the chamber A. The heating and concentrating chamber A is intended for the reception of a body of weak separated sludge acid, the said acid being preferably introduced into the said chamber by way of the tower 18 and by means of an inlet pipe 23, said inlet pipe being provided preferably with spraying means 24 for causing the weak acid to flow through the concentrating chamber in the form of a spray, the weak acid being preheated by the countercurrent gases flowing up through the chamber and by the heated packing 19, the more volatile hydrocarbons in the acid being here driven off. In some cases where the sludge acid contains a high percentage of the heavier hydrocarbons such as the tarry matter, subjecting the tower to liability of being plugged up as the sludge acid is run down therethrough, the tower may be eliminated, thus sacrificing the fuel economy and the more easy method of driving out the more volatile impurities, such impurities in this event being then all driven off in the bath. It will be apparent, however, that the tower may be retained and the packing therein eliminated, in which event the preheating effect may be partially retained as effective on the fine acid spray moving down the tower. The tower may be, furthermore, adapted for use with different types of sludge acids, the tower being so constructed as to permit the ready installation of the packing when less tarry sludge acids are desired to be concentrated and purified and to permit the ready removal of the packing when the more tarry acids are desired to be reclaimed. The preheated separated sludge acid after moving down the tower, collects in the flue-like trough of the chamber and is therein subjected to the first heating and concentrating treatment. Heated air or gases is conducted into the pipe sections 14 and forced through the perforations thereof, the said heated gases agitating and heating the body of weak acid in the trough, the heated gases effecting concentration of the acid and being effective for oxidizing, breaking up and driving off considerable of the organic impurities in the acid. The acid during this treatment is kept at a strength below that strength equivalent to the charring or coking point of the acid, it having been found that treatment of the acid in its first stage in this manner will eliminate considerable of the impurities and will prevent subsequent coking or charring of the hydrocarbons.

As a specific example the acid in the first heating and concentrating chamber A is maintained at a temperature of from 220 to 320 degrees F., depending upon the kind of acid used. The temperature is noted by means of thermometers immersed in the acid bath in chamber A and the temperature is regulated by means of controlling the inflow of weak gases moving into the tower 18 by way of the inlet pipe 23. If the temperature rises above the desired point for any particular acid, the flow of weak acid through the inlet is increased, with the result that the concentration of the acid bath in the A chamber is decreased, the decrease in the temperature following therefrom. If the temperature falls below the desired point the flow of incoming weak acid is decreased with the result that the concentration of the acid in the A chamber is increased, the temperature thereby increasing. The temperature is therefore regulated by controlling the concentration of the acid bath and in this manner the concentration and temperature are kept within a range below the charring or coking point.

The second heating and concentrating chamber B is also preferably formed with a trough-like flue having a bottom 25 and an arched roof 26 formed of acid resisting material, the said flue communicating with the packed absorption tower 27, which may be also provided with a checker brick work 28, suitably supported by a bridge 29 and spaced arches 30, the said absorption tower being also provided with an outlet pipe section 31 for outwardly conducting the spent gases from the tower 27.

After partially concentrating and purifying the acid in chamber A the treated acid is conducted to and introduced into chamber B, the egg C having its inlet 32 communicating with and opening into the concentrating chamber A and having its outlet pipe 33 leading to and connecting with the inlet spray 34 of the absorption tower 27, being provided for this purpose. The now partially concentrated acid is thus admitted into the concentrating chamber B in the form of a spray, the acid being further pre-heated by passing countercurrent to the spent gases moving up the tower 27, the now partially concentrated acid collecting in the concentrating chamber B to undergo further treatment.

The flow of the acid from the chamber A to the egg C and the flow of the acid from the egg C to the second concentrating tower 27 is an uninterrupted flow, the process being a continuous process. The movement of the acid from the egg C to the concentrating tower 27 is regulated, however, independent of the flow of the acid from the chamber A to the egg C for the purpose of controlling the temperatures in the chamber B, as will appear presently. The inlet 32, however, is preferably so contoured that the flow of the acid from chamber A to egg C is in proportion to the volume of flow of the incoming weak acid at inlet 23.

The acid in chamber B may be heated in any desired manner, it being preferred, however, to internally heat the body of acid in the said chamber. This acid may be heated either while in a static or in an agitated condition, it being preferred, however, to internally heat the acid in this second chamber also by means of heated gases forced under pressure through the body of acid. For this purpose we also provide in the chamber B a pipe section 35 made of acid resisting material, the pipe section 35 being provided with a plurality of perforations 36 spaced longitudinally of the pipe, the said conducting pipe section 35 being suitably connected to the source of heated gas supply in a manner similar to the connection of pipe 14 in chamber A. The acid in the concentrating chamber B is heated by this means to effect further concentration of the acid, completion of purification of the acid being also effected during this heat treatment. The temperature in chamber B is maintained from about 400 degrees F. to 430 degrees F. (when making 66° Baumé acid), the temperature in the said chamber B being regulated by controlling the flow of the acid at the inlet 34 in a manner similar to the control of the temperatures in the concentrating chamber A. The spent gases move up through the tower 27 and have exit through the outlet 31, these spent gases being passed through scrubbing towers or precipitators (not shown) which are suitably connected to the pipe section 31 for the purpose of washing the gases and freeing the same from the obnoxious acid fumes and for the further purpose of reclaiming the said fumes for further use.

After effecting the desired concentration of the acid, which may be about 66 degrees Baumé, the acid is drawn off from the concentrating chamber B, a suitable discharge pipe 37 being provided for this purpose.

The use of our apparatus and the practicing of our method will, in the main, be apparent from the above detailed description thereof. The weak acid is introduced through the spraying pipe or distributor 24, the acid being preheated by movement through the tower 18, the more volatile impurities being here driven off, the acid collecting in the concentrating chamber A being subjected therein to internal heat treatment by means of hot air or gases passed under pressure into the conducting pipe 14 and through the body of acid in the concentrating chamber. Care is taken to prevent the acid in this chamber from reaching a strength equivalent to the charring or coking point of the acid. By treating the acid in this manner considerable of the impurities are eliminated during this first heating treatment, subsequent charring and coking of the hydrocarbons being prevented, as hereinbefore indicated. The now partially concentrated and purified acid is then conduced to and introduced into the tower 27 of the concentrating chamber B, the acid being further heated by movement through the absorption tower and collecting in the trough-like flue of the concentrating chamber B, the acid being subjected to further heat treatment in this concentrating chamber for effecting completion of the concentration and purification of the acid.

While we have shown our device in the preferred form, it will be obvious that many changes and modifications may be made in the structure disclosed without departing from the spirit of the invention, defined in the following claims.

We claim:

1. The method of treating sludge acids or separated sludge acids which consists in first subjecting a body of the acid to heat treatment while keeping the same at a strength below the charring or coking point thereof and in thereafter subjecting the acid to further heat treatment.

2. The method of treating sludge acids or separate sludge acids which consists in first subjecting the acid to heat treatment while keeping the same between 47 and 57 degrees Baumé and in thereafter subjecting the acid to further heat treatment raising the same above 57 degrees Baumé.

3. The method of treating sludge acids or separated sludge acids which consists in subjecting a body of the acid to heat at one stage while keeping the acid below the foaming point thereof and in then subjecting the acid to further heat at another stage to raise the same above the said foaming point.

4. The method of treating sludge acids or separated sludge acids which consists in first subjecting a body of the acid to heat to effect partial concentration of the same while keeping the acid just below the charring or coking point thereof and to effect an elimination of organic impurities and in thereafter subjecting the acid to further heat effecting completion of concentration of the same.

5. The method of treating sludge acids or separated sludge acids which consists in first subjecting a body of the acid to heat to effect partial concentration of the same while keeping the acid between 47 and 57 degrees Baumé and to effect an elimination of organic impurities and in thereafter subjecting the acid to further heat effecting further concentration of the same.

6. The method of treating sludge acids which consists in first passing hot air or gas through a body of the acid while keeping the acid at a strength below the charring or coking point thereof and in then subjecting the acid to further heat treatment raising the same above the said strength.

7. The method of treating sludge acids or separated sludge acids which consists in first passing hot air or gas through the acid to concentrate the same to a strength between 47 and 57 degrees Baumé and to eliminate organic impurities and in thereafter subjecting the acid to further heat treatment for effecting further concentration of the same.

8. The method of treating sludge acids or separated sludge acids which consists in first passing hot air or gas through a body of the acid, heating and agitating the acid to concentrate the same while keeping the acid below the foaming point thereof and to eliminate organic impurities and in thereafter subjecting the acid to further heat treatment for effecting further concentration of the same.

9. The method of treating sludge acids or separated sludge acids which consists in first passing hot air or gas through a body of the acid while keeping the acid at a strength below the charring or coking point thereof and in thereafter passing hot air or gas through the acid raising the same above the said strength.

10. The method of treating sludge acids or separated sludge acids which consists in passing hot air or gas through a body of acid in one stage, heating and agitating the acid to concentrate the same while keeping the acid just below the charring or coking point thereof and to eliminate organic impurities and in thereafter passing hot air or gas through the so treated acid at another stage to effect further concentration of the same.

11. The method of treating acids or separated sludge acids which consists in first passing hot air or gas through the acid while keeping the acid at a strength between 47 and 57 degrees Baumé and in thereafter passing hot air or gas through the acid raising the same above the said strength.

12. That step in the process of treating sludge acids which consists in subjecting a body of the acid or separated sludge acids to heat to concentrate the same and to eliminate organic impurities while keeping the acid below and close to the charring or coking point thereof.

13. That step in the process of treating sludge acids which consists in passing hot air or gas through a body of the acid, heating and agitating the latter to effect concentration of the same and to drive off organic impurities while preventing the acid from rising above that strength equivalent to the charring or coking point of such acid.

14. That step in the process of treating sludge acids which consists in subjecting the acid to heat while keeping the acid between a strength of 47 and 57 degrees Baumé.

15. That step in the process of treating sludge acids or separated sludge acids which consists in passing hot air or gas through a body of the acid, heating and agitating the latter to effect concentration of the same and to drive off organic impurities while preventing the acid from rising above a strength of 57 degrees Baumé.

16. The method of treating sludge acids which consists in first passing hot air or gas through the acid in one chamber while keeping the acid in said chamber below the charring or coking point, in spraying weak acid into said chamber, the weak acid being preheated by a countercurrent of gases having exit from said chamber and in drawing off the so treated acid from said chamber and passing the same into a second chamber where the acid is subjected to further heat treatment.

17. The method of treating sludge acids which consists in first passing hot air or gas through the acid in one chamber while keeping the acid in said chamber at a strength below the charring or coking point, in spraying weak acid into said chamber, the weak acid being preheated by a countercurrent of gases having exit from said chamber and in drawing off the so treated acid from said chamber, spraying the same into a second chamber and in passing hot air or gas through the second chamber to effect concentration of the acid above the said strength, the acid in the said second chamber being also preheated by a countercurrent of the gases having exit from the said second chamber.

18. The method of treating sludge acids or separated sludge acids which consists in bubbling hot air or hot gases through a body of the sludge acid to effect partial concentration thereof to an intermediate strength, and in thereafter bubbling hot air or hot gases through a body of the partially concentrated acid to effect further concentration thereof.

19. The method of treating sludge acids or separated sludge acids which consists in bubbling hot air or hot gases through a body of the sludge acid to effect partial concentration thereof to an intermediate stage, in feeding a weak sludge acid into the said body, in preheating the said weak feed acid, in thereafter bubbling hot air or hot gases through a body of the partially concentrated acid to effect further concentration thereof, in feeding the partially concentrated acid into said last mentioned body and in preheating the partially concentrated acid during such feeding.

Signed at Charlotte in the county of Mecklenburg and State of North Carolina this 25th day of May A. D. 1921.

INGENUIN HECHENBLEIKNER.
THOMAS C. OLIVER.